(12) United States Patent
Hsia et al.

(10) Patent No.: US 11,193,816 B2
(45) Date of Patent: Dec. 7, 2021

(54) HEALTH MONITOR METHOD FOR AN EQUIPMENT AND SYSTEM THEREOF

(71) Applicant: INDUSTRIAL TECHNOLOGY RESEARCH INSTITUTE, Hsinchu (TW)

(72) Inventors: Chi-Chun Hsia, Kaohsiung (TW); Wan-Jung Chang, Tainan (TW); Jun-Bin Yeh, Kaohsiung (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 431 days.

(21) Appl. No.: 16/233,293

(22) Filed: Dec. 27, 2018

(65) Prior Publication Data
US 2020/0116553 A1 Apr. 16, 2020

(30) Foreign Application Priority Data
Oct. 12, 2018 (TW) .................................. 107135993

(51) Int. Cl.
*G01H 1/00* (2006.01)
*G01M 1/22* (2006.01)
(Continued)

(52) U.S. Cl.
CPC ............... *G01H 1/003* (2013.01); *G01D 1/02* (2013.01); *G01D 1/14* (2013.01); *G01D 1/16* (2013.01);
(Continued)

(58) Field of Classification Search
CPC .......... G01H 1/00; G01H 1/003; G01D 3/022; G01D 3/08; G01D 1/16; G01D 1/14;
(Continued)

(56) References Cited

U.S. PATENT DOCUMENTS 5,566,092 A 10/1996 Wang et al.
9,922,307 B2* 3/2018 Hyde ..................... G06Q 50/01
(Continued)

FOREIGN PATENT DOCUMENTS

CN 102435436 A 5/2012
CN 107153929 A 9/2017
(Continued)

OTHER PUBLICATIONS

Aleksandar Milenkovic, Wireless sensor networks for personal health monitoring: Issues and an implementation, Mar. 6, 2006, 13 pages (Year: 2006).*
(Continued)

*Primary Examiner* — Tung S Lau
(74) *Attorney, Agent, or Firm* — Locke Lord LLP; Tim Tingkang Xia, Esq.

(57) ABSTRACT

An embodiment of an equipment health state monitoring method adapted to monitor an equipment having a monitored part, including: obtaining a plurality of first values of the monitored part from a sensor in a first time period; extracting a plurality of first parameters from the first values; generating an equipment health state index model according to the first parameters; obtaining a plurality of second value from the sensor in a second time period after the first time period; extracting a plurality of second parameters from the second values; generating a plurality of equipment health state indices according to the second parameters and the equipment health state index model; generating a health state control chart according to the equipment health state indices; and determining whether each of the equipment health state indices locates in an alert area of the health state control chart and outputting a determination result accordingly.

20 Claims, 5 Drawing Sheets

(51) Int. Cl.

| | | |
|---|---|---|
| *G01D 1/16* | (2006.01) | |
| *G01D 1/14* | (2006.01) | |
| *G01D 1/02* | (2006.01) | |
| *G01D 3/02* | (2006.01) | |
| *G01D 3/08* | (2006.01) | |
| G01M 13/045 | (2019.01) | |
| F02D 41/22 | (2006.01) | |

(52) U.S. Cl.
CPC ............... *G01D 3/022* (2013.01); *G01D 3/08* (2013.01); *G01M 1/22* (2013.01); *F02D 41/22* (2013.01); *F16C 2233/00* (2013.01); *G01M 13/045* (2013.01)

(58) Field of Classification Search
CPC ........ G01D 1/02; G01M 1/22; G01M 13/045; G01M 13/00; G01M 7/02; F02D 41/22; F16C 2233/00
See application file for complete search history.

(56) References Cited

U.S. PATENT DOCUMENTS

| | | | | |
|---|---|---|---|---|
| 10,318,123 | B2 * | 6/2019 | Hyde | G06Q 10/10 |
| 10,710,594 | B2 * | 7/2020 | Zhao | B60N 2/90 |
| 10,964,490 | B2 * | 3/2021 | Henke | H03K 17/601 |
| 2009/0099873 | A1 * | 4/2009 | Kurple | G16H 10/60 705/3 |
| 2013/0018668 | A1 * | 1/2013 | Goldberg | G16H 15/00 705/2 |
| 2014/0163331 | A1 * | 6/2014 | Horseman | A61B 5/0008 600/301 |
| 2014/0331753 | A1 | 11/2014 | Wiebrecht et al. | |
| 2015/0048952 | A1 | 2/2015 | Murphy | |
| 2015/0154364 | A1 | 6/2015 | Biasi et al. | |
| 2015/0211581 | A1 | 7/2015 | Murphy et al. | |
| 2015/0374328 | A1 * | 12/2015 | Ginestet | A61B 5/0011 600/301 |
| 2017/0067796 | A1 | 3/2017 | Kawada et al. | |
| 2018/0284736 | A1 | 10/2018 | Cella et al. | |

FOREIGN PATENT DOCUMENTS

| | | | |
|---|---|---|---|
| TW | 505781 | B | 10/2002 |
| TW | I258581 | B | 7/2006 |
| TW | I282850 | B | 6/2007 |
| TW | I305735 | B | 2/2009 |
| TW | I512501 | B | 12/2015 |
| TW | 201710656 | A | 3/2017 |
| TW | 201738970 | A | 11/2017 |
| TW | 201829984 | A | 8/2018 |

OTHER PUBLICATIONS

Control Chart, 10 pages, Apr. 28, 2021 (Year: 2021).*
Subhas Chandra Mukhopadhyay, Wearable Sensors for Human Activity Monitoring: A Review, 3, Mar. 2015, 10 pages (Year: 2015).*
Jerald Yoo, A 5.2 mW Self-Configured Wearable Body Sensor Network Controller and a 12 W Wirelessly Powered Sensor for a Continuous Health Monitoring System, IEEE Journal of Solid-State Circuits, vol. 45, No. 1, Jan. 2010, 11 pages (Year: 2011).*
Ranganath Kothamasu, System health monitoring and prognostics—a review of current paradigms and practices, 2006, 13 pages (Year: 2006).*
Gyuhae Park, Overview of Piezoelectric Impedance-Based Health Monitoring and Path Forward, The Shock and Vibration Digest, vol. 35, No. 6, Nov. 2003 451-463, © 2003 Sage Publications (Year: 2003).*
X. Jin, Y. Sun, Z. Que, Y. Wang and T. W. S. Chow,Anomaly Detection and Fault Prognosis for Bearings, IEEE Transactions on Instrumentation and Measurement, Sep. 2016, vol. 65, No. 9, pp. 2046-2054.
K. Medjaher, N. Zerhouni and J. Baklouti, Data-driven prognostics based on health indicator construction: Application to PRONOSTIA's data, 2013 European Control Conference (ECC), Jul. 2013, pp. 1451-1456.
A. Soualhi, K. Medjaher, N. Zerhouni and H. Razik, Early detection of bearing faults by the Hilbert-Huang transform, 2016 4th International Conference on Conlrol Engineering & Information Technology (CEIT), Dec. 2016 ; pp. 1-6.
K. Javed, R. Gouriveau, N. Zerhouni and P. Nectoux, Enabling Health Monitoring Approach Based on Vibration Data for Accurate Prognostics, IEEE Transactions on Industrial Electronics, Jan. 2015 ; vol. 62, No. 1, pp. 647-656.
Ahmad W, Ali Khan S, Kim JM, Estimating the remaining useful life of bearings using a neurolocal linear estimator-based method, The Journal of the Acoustical Society of America, 201/05, 141(5):EL452.
R. K. Singleton, E. G. Strangas and S. Aviyente, Extended Kalman Filtering for Remaining-Useful-Life Estimation of Bearings, IEEE Transactions on Industrial Electronics, 2015/03, vol. 62, No. 3, pp. 1781-1790.
Sergey Porotsky, Zigmund Bluvband, ALD Group, Remaining useful life estimation for systems with non-trendability behaviour, 2012.
Taiwan Patent Office, "Notice of Allowance", Jun. 28, 2019, Taiwan.

* cited by examiner

HEALTH MONITOR METHOD FOR AN EQUIPMENT AND SYSTEM THEREOF

CROSS-REFERENCE TO RELATED APPLICATIONS

This non-provisional application claims priority under 35 U.S.C. § 119(a) on Patent Application No(s). 107135993 filed in Taiwan on Oct. 12, 2018, the entire contents of which are hereby incorporated by reference.

TECHNICAL FIELD

This disclosure relates to an equipment health state monitoring method and a system thereof, more particular, to an equipment health state monitoring method and system configured to be applied to an equipment having a preconfigured monitored part.

BACKGROUND

Regarding the equipment with monitored parts, the monitored part is a part whose operating state should be monitored continuously. Here taking a rotary part as an example, the rotary part is coupled with other components in the equipment. For example, the processing machine has a spindle with a rotary part, and the spindle is coupled with a tool. When the health of the equipment is degraded, the stability of other components mounted on the spindle also degrades during the rotation. This affects the quality of the processed product and even causes damage to the equipment. In other words, the health of the rotary part affects the output of the equipment. Once the rotary parts are removed for inspection, it is often necessary to perform a complicated calibration procedure after the rotary parts are reinstalled. Therefore, disassembling rotating parts to check their health is not a method usually adopted.

In addition to the disassembly-reassembly inspection method, sensors can be installed near a part to instantly collect its current state. Furthermore, with a statistical method or a frequency analysis method, some related parameters can be extracted from the sensed values generated by the sensor. Besides, the sensed values can be directly used, and the historical data can be referred to manually set an appropriate threshold. When the sensed values exceeds the threshold, an alert is issued to notify the user of the equipment. However, the sensed values of the sensor, such as the vibration spectrum, may deviate from the range of values due to various conditions. Said various conditions comprise hardware changes, (such as parts repair, equipment maintenance, or component assembly/disassembly) software changes, (such as increasing the rotation speed, adjusting the equipment operating mode), and external factor change (such as replacing the processing materials causes the heavy load). Therefore, when the sensed values are affected by the above conditions, the threshold value needs to be reset, too. In other words, only a few fixed thresholds defined beforehand are not applicable to various application scenarios.

On the other hand, the conventional way to apply the sensor is usually to install wired or wireless sensors on or near the equipment, then the monitoring works are performed separately. An alert is issued as soon as the sensed value(s) of any sensor reaches the warning threshold. However, from an expert's point of view, the abnormality of the equipment requires observing the values of various sensors and making a comprehensive judgment to draw conclusions. For example, if the vibration of the processing machine increases, it is also necessary to observe whether the temperature of the spindle greatly increases at the same time. If the temperature does not increase, then one can determine that the vibration is not caused by a load increasing and an equipment abnormality can be further determined. In other words, relying only on the values of sensors and their thresholds may increase the probability of false alarms.

SUMMARY

According to one or more embodiment of this disclosure, an equipment health state monitoring method adapted to monitor an equipment having a preconfigured monitored part, with the monitoring method comprising: obtaining a plurality of first values of the preconfigured monitored part from at least one sensor in a first time period; extracting a plurality of first parameters from the first values; generating an equipment health state index model according to the first parameters; obtaining a plurality of second value from the at least one sensor in a second time period after the first time period; extracting a plurality of second parameters from the second values; generating a plurality of equipment health state indices, each respectively according to the second parameters and the equipment health state index model; generating a health state control chart according to the equipment health state indices; and determining whether each of the equipment health state indices locates in an alert area of the health state control chart and outputting a determination result accordingly.

According to one or more embodiment of this disclosure, an equipment health state monitoring system adapted to monitor an equipment having a preconfigured monitored part and at least one sensor, the monitoring system comprising: a parameter extracting device electrically connecting to the at least one sensor, wherein the parameter extracting device obtains a plurality of first values of the preconfigured monitored part in a first time period and extracts a plurality of first parameters from the first values; and obtains a plurality of second values of the preconfigured monitored part in a second time period and extracts a plurality of second parameters from the second values; a model generating device electrically connecting to the parameter extracting device, wherein the model generating device generates an equipment health state index model according to the first parameters; an index converting device electrically connecting to the parameter extracting device and the model generating device, wherein the index converting device generates a plurality of equipment health state indices, each respectively according to each of the second parameters and the equipment health state index model; an estimating device electrically connecting to the model generating device and the index converting device, wherein the estimating device generates a health state control chart according to the equipment health state indices, determines whether each of the equipment health state indices locates in an alert area of the health state control chart, and outputs a determination result accordingly; and a storage device electrically connecting to the model generating device, the estimating device and the index converting device, wherein the storage device is configured to store the equipment health state index model, the health state control chart and each of the equipment health state indices.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

In an embodiment, the operation of the equipment health state monitoring system of the present disclosure has two phases, training phase, and testing phase. The training phase has to be finished before the testing phase starts. The training phase is equivalent to a learning phase. Under a health estimation, the equipment with a preconfigured monitored part works normally, sensors fixed around the preconfigured monitored part in a way of lock or paste are configured to collect a specific number of sensing data for generating an equipment health state index model through at the same time. The testing phase is a real-time monitoring phase when the equipment is formally online. The health state of the equipment can be detected timely based on the sensing data collected during the testing phase and the equipment health state index model generated in the training phase.

Figure 1:
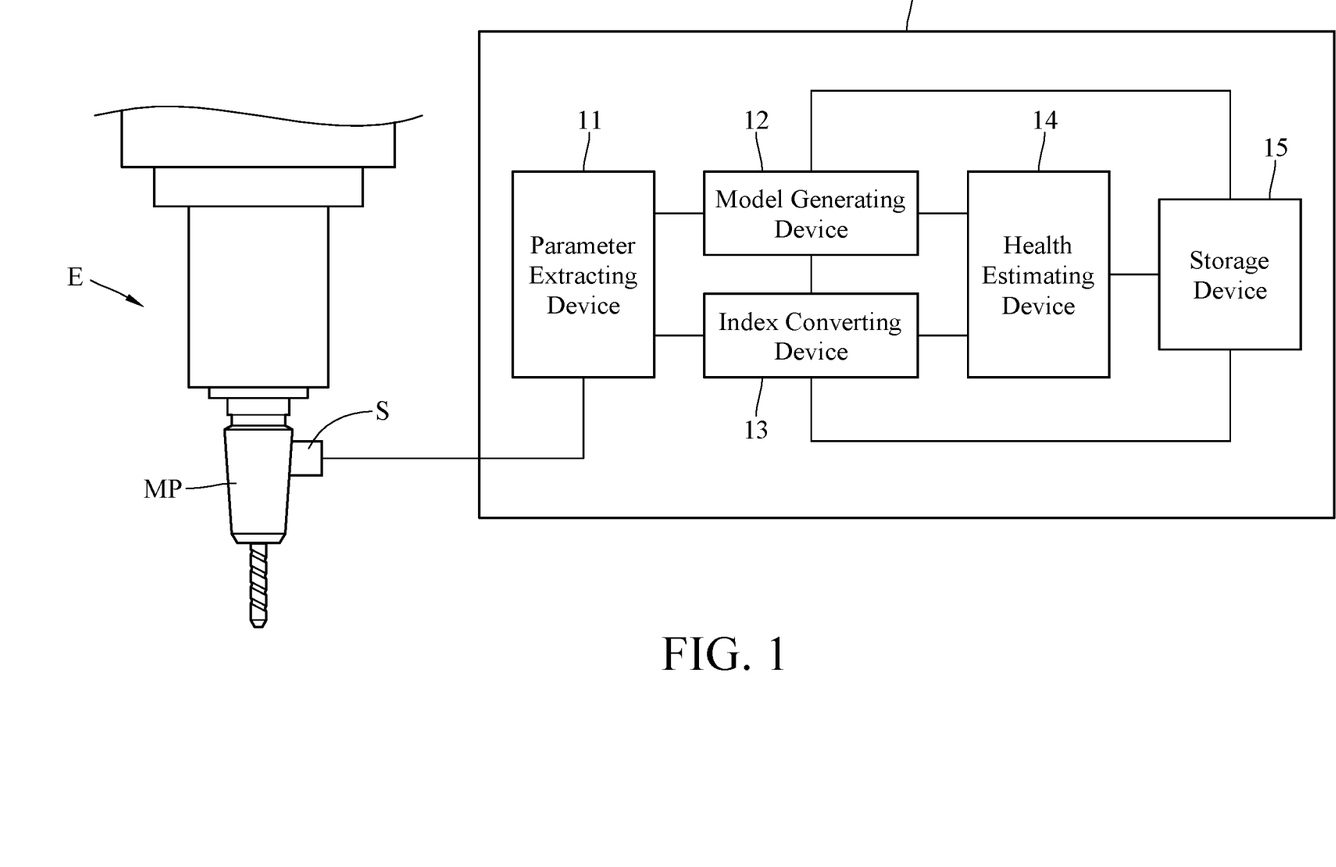
FIG. 1 is a block diagram of the equipment health state monitoring system according to an embodiment of the present disclosure.

Please refer to FIG. 1, which illustrates the block diagram of the equipment health state monitoring system 1 according to an embodiment of the present disclosure. As shown in FIG. 1, the equipment health state monitoring system 1 comprises a parameter extracting device 11, a model building device 12, an index converting device 13, an estimating device 14, and a storage device 15. The above devices can be implemented in multiple ways. For example, a practical example comprises a hardware circuit implemented by logical arrays, a PLA (programmable logic array), an FPGA (field programmable gate array), a mask programmable IC, or an ASIC (application-specific IC). A practical example of any of these devices may include software-based executable resources that are performed by a corresponding internal processor circuit, such as a microcontroller (not shown). One or more ICs are used for the practical example, wherein an executable code stored in a memory circuit (such as the storage device 15) is performed, and the IC served to implement the processor circuit stores application state variables into the processor memory so that the executable application resource may be generated to perform the device operations as described herein.

Please refer to FIG. 1. The equipment health state monitoring system according to an embodiment of the present disclosure is adapted to monitor an equipment E having a preconfigured monitored part MP and at least one sensor S. The preconfigured monitored part MP is a part need to monitor its operating state. In an embodiment, the preconfigured monitored part is a rotary part, such as a bearing, a rotor element, an air compressor, a power transmission belt, etc. This embodiment adopts the rotary part as an example, but the present disclosure is not limited thereto. The parameter extracting device 11 electrically connected to the at least one sensor S, thereby obtaining a plurality of first values of the preconfigured monitored part in a first time period and obtaining a plurality of second values of the preconfigured monitored part in a second time period. The first time period is the training phase as previously described and the first values are sensed values generated by the sensor S during the training phase. The second time period is the testing phase as previously described and the second values are sensed values generated by the sensor S during the testing phase. For the convenience of description, the term "sensed values" is used to refer to the first values and the second values in the following description. In an embodiment, there are R sensors S, the $i^{th}$ sensor S collects $r_i$ values $\{x_{i,j} | 1 \le j \le r_i\}$ in total $\{x_{i,j} | 1 \le j \le r_i\}\{x_{i,j} | 1 \le j \le r_i\}$, and $\mathcal{N}$ of the $r_i$ values of each sensor S are extracted for alignment, i.e., $\{x_{i,j} | 1 \le j \le \mathcal{N}\}\{x_{i,j} | 1 \le j \le \mathcal{N}\}\{x_{i,j} | 1 \le j \le \mathcal{N}\}$.

In order to enable the equipment health state monitoring system described in an embodiment of the present disclosure to detect more kinds of abnormalities, a plurality of kinds of sensed values may be input to the parameter extracting device 11. This disclosure does not limit the type of sensor S. The sensor S only needs to regularly generate digital values to reflect the state of the equipment E. Practically, the sensor S can also be selected according to the experience of the field experts. Taking the tool machine as an example, the preferred type of sensor S is accelerometer and temperature sensor according to the field experts experience and the consideration of the prices of the sensor S and the abnormal type that can be reflected. In this embodiment, said at least one sensor S may be selected from one of the following sensors, for example, a temperature sensor, a vibration sensor, a pressure sensor, a torque sensor, a humidity sensor, or a combination of two or more sensors listed above, and the present disclosure is not limited thereto. The equipment is such as a processing machine, a train car wheel, a comminutor, a turbine, an electric generator, a rolling mill, etc., however, the present disclosure is not limited thereto.

After obtaining the sensed values, the parameter extracting device 11 then extracts multiple first parameters and second parameters. In different embodiments, the extracted first parameters and the second parameters may be a statistic-type parameter or a frequency-type parameter or a mixture of both types. The frequency-type parameter comprises a band-type parameter and a time-frequency-type parameter, but the present disclosure is not limited to the above types. The statistical type parameters are, for example, $RMS_{i,j}$ (root mean square), $SMR_{i,j}$ (square mean root), $PP_{i,j}$ (peak-to-peak amplitude), $CrestFactor_{i,j}$ (peak-to-peak factor), $Kurtosis_{i,j}$ (sample kurtosis), or $Skewness_{i,j}$ (sample skewness). The band-type parameters are, for example, the energy intensities $BPO_{1,j,1}$, $BPI_{1,j,1}$, and $BS_{1,j,1}$ corresponding to frequencies $F_{BPO}$ (Ball Pass Frequency of Outer Ring), $F_{BPI}$ (Ball Pass Frequency of Inner Ring), $F_{BS}$ (Ball Spin Frequency), etc., and energy intensities of 2 or 3 times in frequency $BPO_{i,j,2}$, $BPI_{i,j,2}$, $BS_{i,j,2}$, $BPO_{i,j,3}$, $BPI_{i,j,3}$, and $BS_{i,j,3}$. The time-frequency-type parameter is, for example, a wavelet transform parameter. In an embodiment of the present disclosure, the parameter extracting device 11 adopts a 3-level wavelet decomposition on $x_{i,j}$, and extracts statistics of the Wiener entropy of each sub-band, such as an average $ME_{i,j,k}$ and the variation $SE_{i,j,k}$ to constitute a part of the first parameters and the second parameters.

In an embodiment, based on the defined calculation process of each kind of parameters, the parameter extracting device 11 extracts a plurality of first parameters from the first values and extracts a plurality of second parameters from the second values. The parameter extracting device 11 makes the first parameters extracted at a time from all sensors S of each type into the form of a multi-dimensional vector shown as follows.

$$\mathcal{V}_j = \begin{bmatrix} RMS_{1,j}, SMR_{1,j}, \ldots, Skewness_{1,j}, \\ BPO_{1,j,1}, \ldots, BPO_{1,j,3}, \ldots, BS_{1,j,1}, \ldots, BS_{1,j,3}, \\ WE_{1,j,1}, \ldots, WE_{1,j,3}, \ldots, SE_{1,j,3}, \\ RMS_{R,j}, SMR_{R,j}, \ldots, Skewness_{R,j}, \\ BPO_{R,j,1}, \ldots, BPO_{R,j,3}, \ldots, BS_{R,j,1}, \ldots, BS_{R,j,3}, \\ WE_{R,j,1}, \ldots, WE_{R,j,3}, \ldots, SE_{R,j,3} \end{bmatrix}$$

At each time point during the first time period (training phase), each multi-dimensional vector concatenated by the parameter extracting device 11 may constitute a training dataset $\mathcal{V}^{TR} = \{\mathcal{V}_j \mid 1 \le j \le \mathcal{N}^{TR}, \mathcal{V}_j \in \mathcal{R}^d\}$ with a vector number $\mathcal{N}^{TR}$ and a dimension d, so that the model generating device 12 generates the equipment health index model. At each time point during the second time period (testing phase), each multi-dimensional vector concatenated by the parameter extracting device 11 may constitute a testing dataset of $\mathcal{V}^{TE} = \{\mathcal{V}_j \mid 1 \le j \le \mathcal{N}^{TE}, \mathcal{V}_j \in \mathcal{R}^d\}$, so that the index converting device 13 performs conversions for each of real-time data $\mathcal{V}_j$ to generate equipment health indices.

Please refer to FIG. 1. Since the electrical connection between the parameter extracting device 11 and the model generating device 12, the model generating device 12 receives the training dataset consisting of the first parameters from the parameter extracting devices 11 and the device health index model is generated according to the training dataset. The parameter extracting device 11 stores the training dataset in a historical database in the storage device 15. The equipment health index model is, for example, a data depth model, a GMM (Gaussian mixture model), or a SOM (Self-Organizing Map). However, the above three models are merely illustrative and are not intended to limit the equipment health index model described in the present disclosure. In another embodiment of the present disclosure, the model generating device 12 further updates the equipment health index model according to at least one multi-dimensional vector of the second parameters. In other words, the equipment health index model can be updated synchronously with the newly sensed data obtained during the testing phase.

Please refer to FIG. 1. The index converting device 13 electrically connects to the parameter extracting device 11 and the model generating device 12. The index converting device 13 generates a plurality of equipment health indices, each respectively according to each of the second parameters and the equipment health index model. In the following paragraphs, the manner in which the index conversing device 13 generates the equipment health index will be respectively described according to the health index model employed by the model generating device 12.

In an embodiment, when the model generating device 12 adopts a Gaussian mixture model, which adopts a weighted average of a plurality of Gaussian density functions to describe the probability density function of the training data set $\mathcal{V}^{TR}$, as shown below.

$$\mathcal{G}(\mathcal{V} \mid \omega, \mu, \Sigma) = \Sigma_{k=1}^{\mathcal{K}} \omega_k \mathcal{g}(\mathcal{V} \mid \omega, \mu_k, \Sigma_k)$$

where $\mathcal{K}$ is the number of Gaussian density functions, and $\omega, \mu, \Sigma$ are the parameters of the Gaussian mixture model, respectively representing the weights, averages, and variances of the Gaussian density functions. The conversion of the index converting device 13 for the likelihood of the second parameters is defined as follows:

$$L(\mathcal{V}_j \mid \omega, \mu, \Sigma) = \mathcal{G}(\mathcal{V}_j \mid \omega, \mu, \Sigma) = \Sigma_{k=1}^{\mathcal{K}} \omega_k \mathcal{g}(\mathcal{V}_j \mid \omega, \mu_k, \Sigma_k)$$

The output of the GMM is NLL (negative log likelihood, NLL) whose number range is $\pm\infty$. In an embodiment, the negative value of NLL can be regarded as the equipment health as follows.

$$I(\mathcal{V}_j) = -\log L(\mathcal{V}_j \mid \omega, \mu, \Sigma)$$

As a result, during the second time period, the index converting device 13 may substitute each of the second parameters into the probability density function of the Gaussian mixture model. The larger the calculated value is, the lower the similarity between the current equipment health index and the equipment health index model is.

In another embodiment, when the model generating device 12 adopts the SOM (Self-Organizing Map), an unsupervised clustering, such as K-means, may be performed with the topological layer neurons obtained in the end to determine the final clustering result. In the second time period, the index converting device 13 calculates the Euclidean distance between a second parameter and the nearest neuron and takes the negative value of the distance to serve as the equipment health index as follows.

$$I(\mathcal{V}_j) = -D(\mathcal{V}_j, W_k^{BMU})$$

where D represents the Euclidean distance. If the second parameter is still too far away from the nearest neuron, it means that the current equipment state is not healthy enough.

In further another embodiment, the model generating device 12 generates a data depth model as the equipment health index model according to the training dataset. When the model generating device 12 adopts the data depth model, the model generating device 12 is able to perform random projections with the training dataset and with each of the second parameters to output a plurality of depth values. By performing the random projections, a plurality of projected second parameters are obtained by projecting the second parameters onto a plurality of one-dimension random projection vectors, while a projected training dataset is obtained by projecting the training dataset onto the one-dimension random projection vectors. The index converting device 13 further calculates a depth value relative to the projected training dataset for each of the projected second parameters, after a plurality of random projections, calculates an average value of said calculated depth values, and serves said calculated average value as a respective one of the equipment health state indices. In an embodiment, a random projection halfspace depth function is defined as follows.

$$HD_{\mathcal{K}, \mathcal{H}}(\mathcal{V}_j, \mathcal{V}^{TR}) = \min D_{h_i}(\Pi_{h_i}(\mathcal{V}_j), \mathcal{V}^{TR} \circ \Pi_{h_i}^{-1})$$

where $\mathcal{V}_j \in \mathcal{V}^{TE}$ is the second parameters for calculating depth values; $\mathcal{H} = \{h_1, \ldots, h_{\mathcal{K}}\} \in R^d$ is the one-dimension random projection vector set; $\mathcal{K}$ is a number of the total times of the random projections; $\Pi_{h_i}(\mathcal{V}_j)$ is the projected value of $\mathcal{V}_j$ on $h_i$; $\mathcal{V}^{TR} \circ \Pi_{h_i}^{-1}$ represents all values of the projected training dataset on $h_i$; $D_{h_i}(\mathcal{V}_j, \mathcal{V}^{TR} \circ \Pi_{h_i}^{-1})$ is the depth values under $\mathcal{V}^{TR} \circ \Pi_{h_i}^{-1}$.

However, under the original definition, it's not easy to two sample points (said sample points is the first or the second parameters) having a depth value of 0 are less likely to distinguish the difference from the center point. Therefore, in the embodiment of the present disclosure adopting the data depth model, an improved version of the half space function is proposed as follows.

$$IHD_{\mathcal{K},\mathcal{H}}(v_j, \mathcal{V}^{TR}) = \frac{1}{\mathcal{K}}\sum_{i=1}^{\mathcal{K}} D_{h_i}\left(\prod_{h_i}(v_j), \mathcal{V}^{TR} \circ \prod_{h_i}^{-1}\right)$$

In the space of one dimension, the central point of the data is the median of the data. Therefore, the depth values calculated by the index converting device 13 based on the modified half-space function and according to each of the second parameters can be regarded as the equipment health indices, $I(\mathcal{V}_j) = IHD_{\mathcal{K},\mathcal{H}}(\mathcal{V}_j, \mathcal{V}^{TR})$ According to the model generating device 12 and index converting device described above, the equipment health state monitoring system 1 according to an embodiment of the present disclosure can convert the multi-dimensional sensed values generated by the plurality of sensors S into a single equipment health index. Compared to conventional methods based on the comparison of a single sensor with a single threshold, the equipment health state monitoring system 1 according to an embodiment of the present disclosure reduces the chance of false alerts.

Please refer to FIG. 1. The estimating device 14 electrically connects to the model generating device 12, the index converting device 13, and the storage device 15, and generates a health state control chart based on the equipment health indices. Said equipment health indices are the equipment health indices after the first parameters and the second parameters are respectively converted. In an embodiment, the health state control chart is an EWMA (Exponentially Weighted Moving Average) control chart. Because even in the same operating state, the second values, such as the vibration signal, may have different signal trends. EWMA can perform a smooth conversion of the equipment health indices. In an embodiment, the statistics of the EWMA are defined as follows.

$$z_j = \alpha I(\mathcal{V}_j) + (1-\alpha)z_{j-1}$$

where $z_j$ is the EWMA statistic of $I(\mathcal{V}_j)$ including the training dataset, and the initial value $z_0$ is the average value of the equipment health indices in the training dataset. $\alpha$ is a smoothing parameter, which represents the ratio of learning new data, $0 < \alpha \le 1$. It is the conventional SPC (Statistical Process Control) when $\alpha = 1$. There is a better smoothing effect without affecting the overall numerical trend of the equipment health indices when $\alpha = 0.15$.

The estimating device 14 determines whether each of equipment health indices in the testing dataset locates in an alert area of the health state control chart and outputs a determination result accordingly. In an embodiment, the alert area may be determined by a dynamically adjustable LCL (Lower Control Limit) with L-times standard deviation as follows $$LCL_j = m_j - L\sigma_j\sqrt{\frac{\alpha}{2-\alpha}}$$

where $m_j$ is the average of the equipment health indices converted from the training dataset and the testing dataset as follows.

$$m_j = \text{mean}(\{I(\mathcal{V}_i) | 1 \le i \le j\})$$

and $\sigma_j$ is the standard deviation calculated from the training dataset and the testing dataset as follows.

$$\sigma_j = \text{stdev}(\{I(\mathcal{V}_i) | 1 \le i \le j\})$$

Please refer to FIG. 1. The storage device 15 electrically connects to the model generating device 12 and the index converting device 13. The storage device 15 is configured to store the equipment health index model, the device health indices, and a historical database. The historical database comprises the training dataset and the testing dataset before the current time as historical sensed data. The second parameters comprise data at multiple time points. These data are entered into the system one by one at every "current time" in a real-time condition.

Figure 2A:
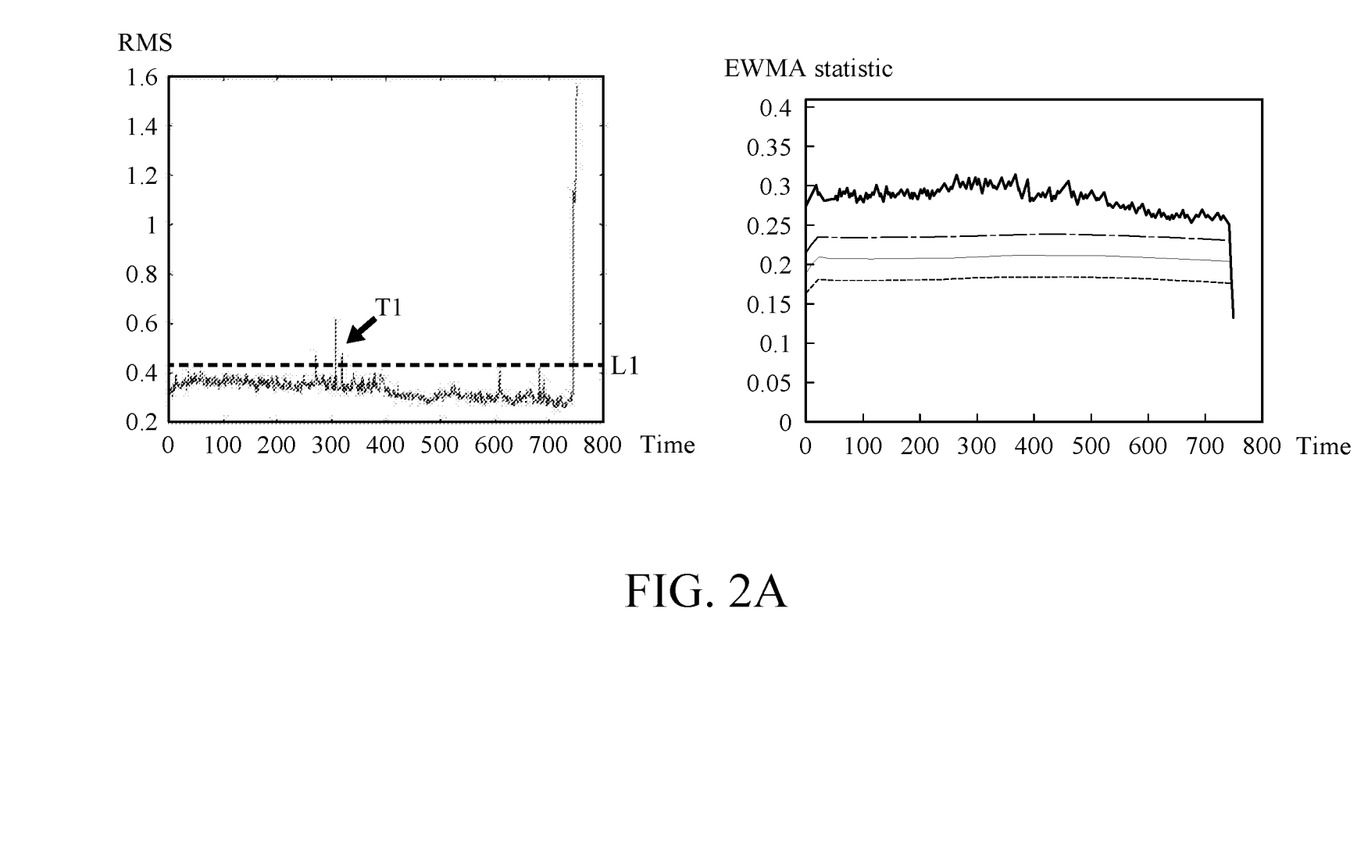
FIGS. 2A, 2B, and 2C are conventional statistic control charts and EWMA charts according to an embodiment of the present disclosure.
Figure 2B:
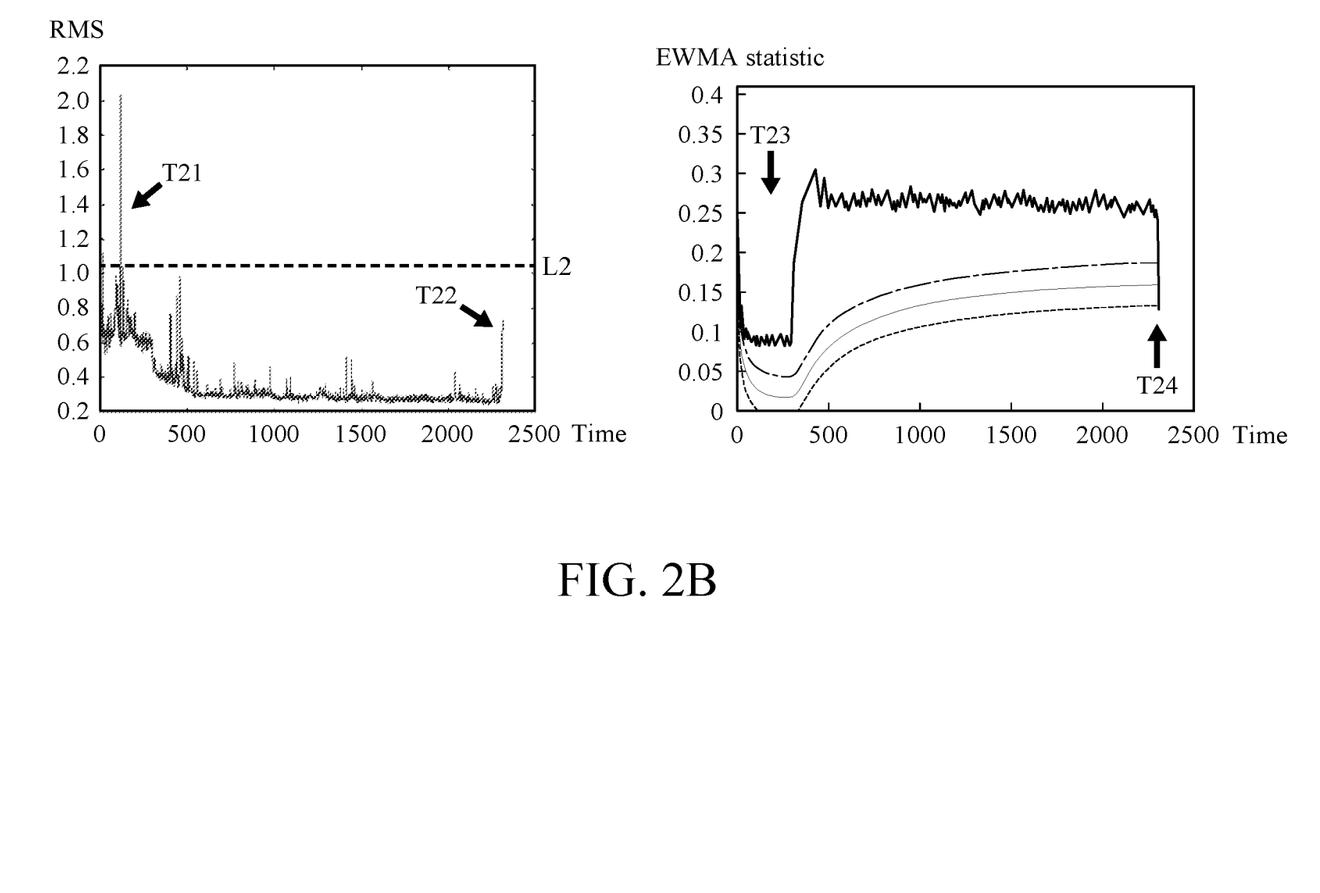
Figure 2C:
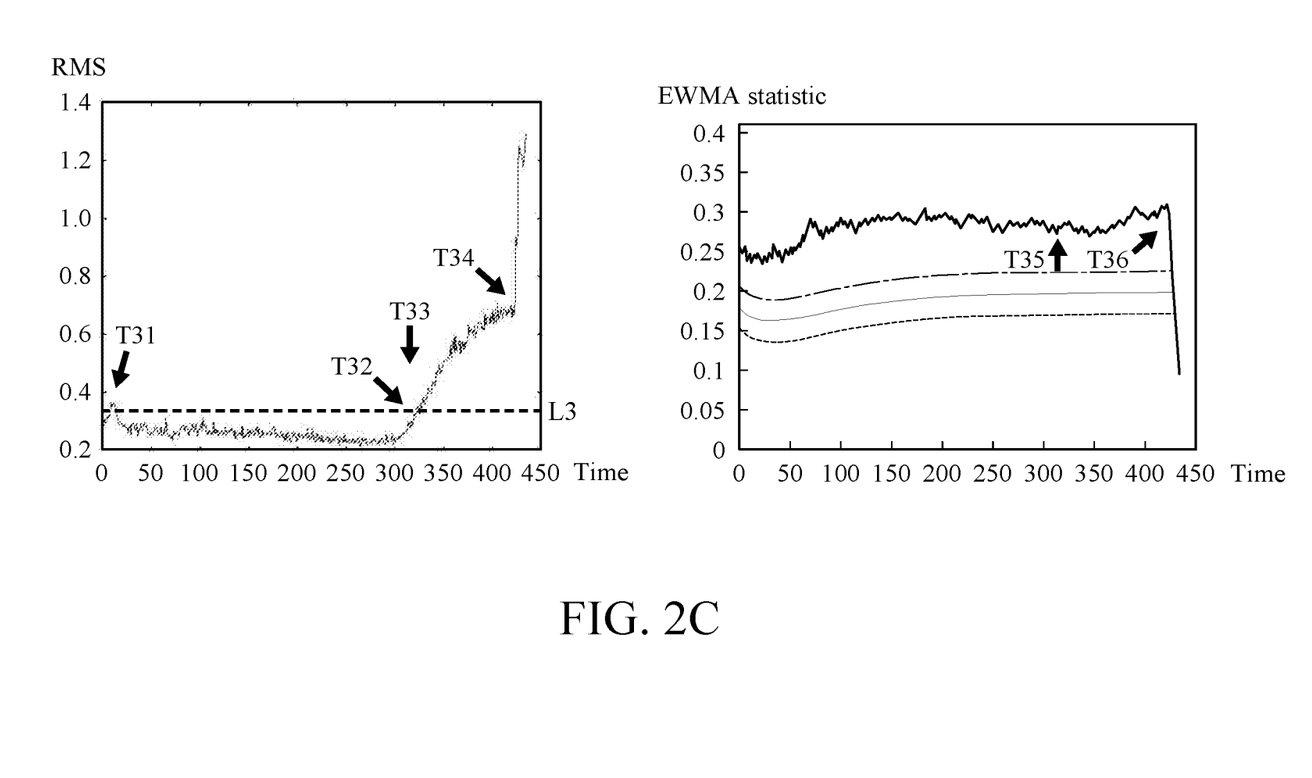

Please refer to FIG. 2A, FIG. 2B, and FIG. 2C, wherein the right drawing of each of the above figures shows the EWMA control chart generated by the health state estimating device 14 according to an embodiment of the present disclosure, and the left drawing of the above figures shows a conventional SPC control chart. In this embodiment, an open data set, IEEE PHM 2012 Data Challenge, is used as a training dataset and a testing dataset.

Please refer to the left drawing of FIG. 2A, the line in the figure represents the RMS (root mean square) parameter values with time, and L1 is a UCL (upper control limit) value calculated according to SPC. As shown in this RMS timing chart, there will be an alert at time T1 (about 310 time units, with 10 seconds per unit) according to the control limit L1. However, this alert is actually a false alarm. Please refer to the right drawing of FIG. 2A. The uppermost line in the drawing is an EWMA statistic, and the lower three lines are the control lower limits calculated by EWMA under different standard deviations. As shown in the EWMA control chart, with the dynamically adjusted EWMA control lower limit, no false alert will be issued at time T1, but rather the abnormality of the equipment E will be detected when the EWMA statistic suddenly falls below the lower control limit.

Please refer to the left drawing of FIG. 2B. A false alert is issued at time T21 according to the conventional SPC control limit L2. However, when the equipment E is actually damaged at time T22, no alert is issued. Please refer to the right drawing of FIG. 2B. At time T23, the EWMA control limit proposed according to an embodiment of the present disclosure can dynamically adjust the range depending on the condition, and the equipment E successfully detects an abnormality at time T24.

Please refer to the left drawing of FIG. 2C. Based on the conventional SPC control limit L3, in addition to the initial false alarm at the time point T31, another alert issued at the time point T32 (at about 320 time units, 10 seconds per unit) is too early. Please refer to the right drawing of FIG. 2C, the EWMA control limit proposed according to an embodiment of the present disclosure can avoid the occurrence of a false alarm at the time point T35, and the state abnormality is successfully detected at the last time point T36.

In view of above, regarding the common RMS parameter, the RMS parameter values are greatly different even under the same conditions. Moreover, the RMS parameter values are particularly large in the initial stage of the testing. Compared to the EWMA control chart proposed by the present disclosure, since the variation degree of the past equipment health indices are put into consideration, the present disclosure has the effect of dynamically adjusting the control limit to ensure that the correct alert is issued when the equipment E does have an abnormal condition, thus the probability of issuing the false alert is reduced.

Figure 3:
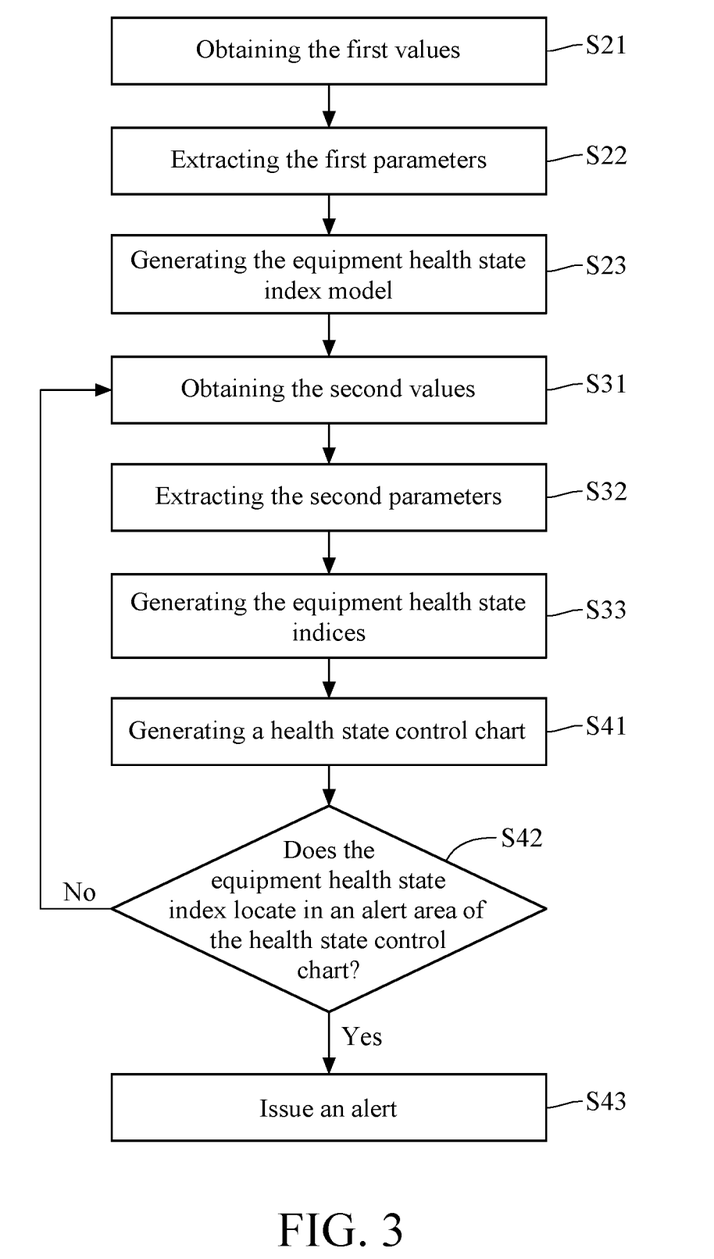
FIG. 3 is a flowchart of the equipment health state monitoring method according to an embodiment of the present disclosure.

Please refer to FIG. 3, which is a flowchart of the equipment health state monitoring method according to an embodiment of the present disclosure. The equipment health state monitoring method is adapted to monitor an equipment E having a preconfigured monitored part MP. In FIG. 3, steps S21-S23 belong to the first time period (training phase), and steps S31-S43 belong to the second time period (testing phase).

Please refer to step S21, "obtaining the first values". In an embodiment, a plurality of first values of the preconfigured monitored part MP are obtained from said at least one sensor S that can periodically reflect the state of the equipment E and generate sensed values corresponding to the state during the first time period.

Please refer to step S22, "extracting the first parameters". In an embodiment, a certain number of first values are extracted from the plurality of first values obtained in step S21 to serve as the first parameters.

Please refer to step S23, "generating the equipment health state index model". Specifically, the first parameters extracted in step S22 are concatenated into a plurality of multi-dimensional vectors. These multi-dimensional vectors form a training dataset. In addition, the data depth model, the Gaussian mixture model, or the self-organizing map model mentioned above may be selectively adopted so that the training dataset may be substituted into the adopted equipment health index model to obtain the output of the training phase.

Please refer to step S31, "obtaining the second values". In an embodiment, a plurality of second values is obtained from said at least one sensor S that can periodically reflect the state of the equipment E and generate sensed values during the second time period.

Please refer to step S32, "extracting the second parameters". In an embodiment, the practical operation of step S32 is similar to step S22. The difference is that only a certain number of first values can be extracted as first parameters in step S22, while all of the second values are extracted as second parameters in step S32.

Please refer to step S33, "generating the equipment health state indices". In an embodiment, the second parameters obtained at each time point of the testing phase are substituted into the equipment health index model adopted in step S23 to calculate timely the equipment health indices. In an embodiment, assuming that the step S23 adopts the data depth model as the health index model, in the step S33 the equipment health indices are calculated in the following manner. First, randomly projecting the training dataset and the second parameter to a plurality of one-dimensional vectors. Secondly, calculating a depth value relative to the projected training dataset, for each of the projected second parameters. Further, an average value of said calculated depth values is calculated after a plurality of random projections, and then the calculated average value is served as a respective one of the equipment health indices. In addition, in step S33, the equipment health index model may also be selectively updated according to at least one of the second parameters.

Please refer to step S41, "generating a health state control chart". In an embodiment, first, the current EWMA statistic can be calculated according to the current equipment health index, the preconfigured smoothing parameter, and the previous EWMA statistic in the second time period. Secondly, the health state control chart can be generated then based on the plurality of EWMA statistics obtained in the way of the above description.

Please refer to step S42, "determining whether the equipment health state indices locates in an alert area of the health state control chart". In an embodiment, first, the sample average value and the same standard deviation can be calculated according to the equipment health index model and the equipment health state indices generated during the testing phase. Secondly, a control lower limit can be calculated according to the sample average and the sample standard deviation and the smoothing parameter mentioned in step S41, and then the range of the alert area can be determined according to the lower control limit.

In step S42, if the equipment health index locates in the alert area of the control chart, an alert is issued to the equipment manager in step S43. Otherwise, the flow of the present disclosure returns to step S31, that is, the sensor S continuously generates the second values, and then the equipment health state is updated based on the flow from step S31 to step S42.

In general, the present disclosure collects various sensed values of the sensors on the equipment and extracts relevant parameters therefrom by statistical methods or frequency analysis techniques. The present disclosure adopts an appropriate equipment health index model and separately converts the extracted parameters to generate the equipment health indices under healthy state and operating state, and the deviation degree of which the current state of the preconfigured monitored part relative to the normal state of the preconfigured monitored part can be described through these health indices. The health index range of the preconfigured monitored part in the normal state can be learned through the EWMA control chart according to an embodiment of the present disclosure, thereby the threshold value of the control limit can be further dynamically adjusted, so the health state of the preconfigured monitored part can be determined instantly. The present disclosure can notify the user of the equipment to perform the treatment in advance when the determined equipment health state turns to abnormal. Compared to the conventional manner, which lacks of a determination mechanism of dynamic control chart, but only uses a single static parameter as the threshold, the present disclosure can effectively improve the efficiency of preventive maintenance of the equipment, further improve the correct rate of abnormal alerts issued by the equipment health monitoring system with the multi-axis or multi-sensor, and does not limit the types of sensors corresponding to the health state of the equipment.

What is claimed is:

1. An equipment health state monitoring method adapted to monitor an equipment having a preconfigured monitored part, with the monitoring method comprising:
    obtaining a plurality of first values of the preconfigured monitored part from at least one sensor in a first time period;
    extracting a plurality of first parameters from the first values;
    generating an equipment health state index model according to the first parameters;
    obtaining a plurality of second values of the preconfigured monitored part from the at least one sensor in a second time period after the first time period;
    extracting a plurality of second parameters from the second values;
    generating a plurality of equipment health state indices, each respectively according to each of the second parameters and the equipment health state index model;
    generating a health state control chart according to the equipment health state indices; and determining whether each of the equipment health state indices locates in an alert area of the health state control chart and outputting a determination result accordingly,
wherein generating the equipment health state index model according to the first parameters comprises:
concatenating the first parameters into a plurality of multi-dimensional vectors;
generating a training dataset according to the plurality of multi-dimensional vectors; and
generating the equipment health state index model associated with the training dataset;
wherein generating the equipment health state index model associated with the training dataset comprises:
generating a data depth model as the equipment health state index model according to the training dataset; and
wherein generating the equipment health state indices, each respectively according to each of the second parameters and the equipment health state index model comprises:
performing a random projection for randomly projecting the training dataset and each of the second parameters to a plurality of one-dimensional vectors;
calculating a depth value relative to the projected training dataset, for each of the projected second parameters; and
calculating an average value of said calculated depth values after a plurality of random projections, and serving the average value as a respective one of the equipment health state indices.

2. The equipment health state monitoring method according to claim 1, wherein the preconfigured monitored part is a rotary part.

3. The equipment health state monitoring method according to claim 1, wherein the at least one sensor is one of a temperature sensor, a vibration sensor, a pressure sensor, a torque sensor, and a humidity sensor, or a combination of two or more sensors listed above.

4. The equipment health state monitoring method according to claim 1, wherein each of the first parameters and each of the second parameters is a statistic-type parameter or a frequency-type parameter.

5. The equipment health state monitoring method according to claim 1, wherein the equipment health state index model is associated with a data depth model, a Gaussian mixture model, or a self-organizing map model.

6. The equipment health state monitoring method according to claim 1, wherein the health state control chart is an exponentially weighted moving average (EWMA) control chart.

7. The equipment health state monitoring method according to claim 1, further comprising updating the equipment health state index model according to at least one of the second parameters.

8. The equipment health state monitoring method according to claim 1, wherein determining whether each of the equipment health state indices locates in the alert area of the health state control chart comprises:
calculating a sample average and a sample standard deviation according to the equipment health state index model and the equipment health state indices; and
calculating a lower control limit according to the sample average, the sample standard deviation, and a smoothing parameter, and determining the alert area based on the lower control limit.

9. The equipment health state monitoring method according to claim 4, wherein the statistic-type parameter is a root mean square, a square mean root, a peak-to-peak amplitude or a sample skewness.

10. The equipment health state monitoring method according to claim 4, wherein the frequency-type parameter is a ball pass frequency of an outer ring, a ball pass frequency of an inner ring, a ball spin frequency, or a wavelet transform parameter.

11. An equipment health state monitoring system adapted to monitor an equipment having a preconfigured monitored part and at least one sensor, the monitoring system comprising:
a parameter extracting device electrically connecting to the at least one sensor, wherein the parameter extracting device obtains a plurality of first values of the preconfigured monitored part in a first time period and extracts a plurality of first parameters from the first values; and obtains a plurality of second values of the preconfigured monitored part in a second time period and extracts a plurality of second parameters from the second values;
a model generating device electrically connecting to the parameter extracting device, wherein the model generating device generates an equipment health state index model according to the first parameters;
an index converting device electrically connecting to the parameter extracting device and the model generating device, wherein the index converting device generates a plurality of equipment health state indices, each respectively according to each of the second parameters and the equipment health state index model;
an estimating device electrically connecting to the model generating device and the index converting device, wherein the estimating device generates a health state control chart according to the equipment health state indices, determines whether each of the equipment health state indices locates in an alert area of the health state control chart, and outputs a determination result accordingly; and
a storage device electrically connecting to the model generating device, the estimating device and the index converting device, wherein the storage device is configured to store the equipment health state index model, the health state control chart and each of the equipment health state indices,
wherein generating the equipment health state index model according to the first parameters comprises:
concatenating the first parameters into a plurality of multi-dimensional vectors;
generating a training dataset according to the plurality of multi-dimensional vectors; and
generating the equipment health state index model associated with the training dataset;
wherein the model generating device further generates a data depth model according to the training dataset, takes the data depth model as the equipment health state index model, and randomly projects the training dataset and each of the second parameters to a plurality of one-dimensional vectors; and
wherein the index converting device further calculates a depth value relative to the projected training dataset, for each of the projected second parameters, and calculates an average value of said calculated depth values after a plurality of random projections, and serves the average value as a respective one of the equipment health state indices.

12. The equipment health state monitoring system according to claim 11, wherein the preconfigured monitored part is a rotary part.

13. The equipment health state monitoring system according to claim 11, wherein the at least one sensor is one of a temperature sensor, a vibration sensor, a pressure sensor, a torque sensor, and a humidity sensor, or a combination of two or more sensors listed above.

14. The equipment health state monitoring system according to claim 11, wherein each of the first parameters and each of the second parameters is a statistic-type parameter or a frequency-type parameter.

15. The equipment health state monitoring system according to claim 11, wherein the equipment health state index model is associated with a data depth model, a Gaussian mixture model, or a self-organizing map model.

16. The equipment health state monitoring system according to claim 11, wherein the health state control chart is an exponentially weighted moving average (EWMA) control chart.

17. The equipment health state monitoring system according to claim 11, wherein the model generating device further updates the equipment health state index model according to at least one of the second parameters.

18. The equipment health state monitoring system according to claim 11, wherein the estimating device further calculates a sample average and a sample standard deviation according to the equipment health state index model and the equipment health state indices, and calculates a lower control limit according to the sample average, the sample standard deviation, and a smoothing parameter to determine the alert area based on the lower control limit.

19. The equipment health state monitoring system according to claim 14, wherein the statistic-type parameter is a root mean square, a square mean root, a peak-to-peak amplitude or a sample skewness.

20. The equipment health state monitoring system according to claim 14, wherein the frequency-type parameter is a ball pass frequency of an outer ring, a ball pass frequency of an inner ring, a ball spin frequency, or a wavelet transform parameter.

* * * * *